US009412264B2

(12) United States Patent
Geerlings et al.

(10) Patent No.: US 9,412,264 B2
(45) Date of Patent: Aug. 9, 2016

(54) WIRELESS TRAINABLE TRANSCEIVER DEVICE WITH INTEGRATED INTERFACE AND GPS MODULES

(75) Inventors: Steven L. Geerlings, Holland, MI (US); Steven Swiftney, Zeeland, MI (US); Landon S. Foy, Hudsonville, MI (US); Jens Ohler, Berlin (DE); Jack A. Huisingh, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 297 days.

(21) Appl. No.: 13/982,047

(22) PCT Filed: Jan. 27, 2012

(86) PCT No.: PCT/US2012/022842
§ 371 (c)(1), (2), (4) Date: Jan. 7, 2014

(87) PCT Pub. No.: WO2012/103408
PCT Pub. Date: Aug. 2, 2012

(65) Prior Publication Data

US 2014/0111315 A1 Apr. 24, 2014

Related U.S. Application Data

(60) Provisional application No. 61/437,394, filed on Jan. 28, 2011.

(51) Int. Cl.

*G08B 21/00* (2006.01)
*G08C 17/02* (2006.01)

(Continued)

(52) U.S. Cl.
CPC ............ *G08C 17/02* (2013.01); *G07C 9/00309* (2013.01); *G08C 23/04* (2013.01); *G07C 2009/00865* (2013.01); *G07C 2009/00928* (2013.01); *G08C 2201/62* (2013.01); *G08C 2201/91* (2013.01)

(58) Field of Classification Search
CPC ..................... G08C 17/02; G07C 2009/00865; B60R 16/037
USPC ........................................... 340/539.13, 12.5
See application file for complete search history.

(56) References Cited

U.S. PATENT DOCUMENTS 5,798,575 A * 8/1998 O'Farrell .................. B60R 1/00 307/10.1
5,903,226 A 5/1999 Suman et al.
7,812,739 B2 10/2010 Chuey (Continued)

FOREIGN PATENT DOCUMENTS

GB 2419446 4/2006
WO WO 03/044625 5/2003

*Primary Examiner* — Mark Rushing
(74) *Attorney, Agent, or Firm* — Price Heneveld LLP; Scott P. Ryan

(57) ABSTRACT

A trainable transceiver having an integrated interface connections with various vehicle modules for use with various remote electronic devices and a method of programming and using the same. The wireless trainable transceiver is in a vehicle with an integrated interface allowing connection to a human to machine interface and vehicle position determination device, such a navigation system and compass and the wireless trainable transceiver has the ability to change functions associated with preset buttons on the trainable transceiver, depending upon the location of the vehicle.

18 Claims, 6 Drawing Sheets

(51) Int. Cl.
*G07C 9/00* (2006.01)
*G08C 23/04* (2006.01)

(56) References Cited

U.S. PATENT DOCUMENTS

| | | | | |
|---|---|---|---|---|
| 7,839,263 | B2 | 11/2010 | Shearer | |
| 2001/0016501 | A1 | 8/2001 | King | |
| 2003/0149526 | A1* | 8/2003 | Zhou | G01S 5/0027 701/408 |
| 2003/0197594 | A1 | 10/2003 | Olson et al. | |
| 2004/0066308 | A1 | 4/2004 | Sampsell | |
| 2004/0121725 | A1 | 6/2004 | Matsui | |
| 2007/0008065 | A1 | 1/2007 | Shearer et al. | |
| 2009/0315751 | A1 | 12/2009 | Bennie et al. | |

* cited by examiner

WIRELESS TRAINABLE TRANSCEIVER DEVICE WITH INTEGRATED INTERFACE AND GPS MODULES

CROSS-REFERENCE TO PRIOR APPLICATION

This U.S. National Stage Patent Application claims the benefit of International Application serial number PCT/US2012/022842 filed Jan. 27, 2012 entitled "Wireless Trainable Transceiver Device With Integrated Interface And GPS Modules," which claims the benefit of U.S. Provisional Patent Application Ser. No. 61/437,394 filed Jan. 28, 2011, entitled "Wireless Trainable Transceiver Device With Integrated Interface And GPS Modules," the entire disclosures of the applications being considered part of the disclosure of this application and hereby incorporated by reference.

TECHNICAL FIELD

This invention relates generally to a trainable transceiver having integrated interface connections with various vehicle modules for use with various remote electronic devices, and a method of programming and using the same, and more particularly, to a wireless trainable transceiver in a vehicle with an integrated interface allowing connection to a human to machine interface and a navigation or GPS device, with the trainable transceiver having the ability to change the functions or tasks associated with preset buttons on the trainable transceiver, depending upon the location of the vehicle, and a method of programming, determining what functions or tasks are associated with a preset button, and using the trainable transceiver to control remote electronic devices.

BACKGROUND OF THE INVENTION

Conventional systems for controlling appliances and devices, such as garage door openers, security gates, home alarms, lighting, computers, etc., use individual wireless handheld transmitters or remote controls to operate the associated appliance and/or device forming a remote electronic system. Most of these wireless remote electronic systems use proprietary remotes or proprietary handheld transmitters that only function with the single device with which they were supplied. Most devices are only supplied with two remotes and if the user has more than two cars, it is likely the user will need to buy additional remote controls. It is also difficult to control multiple devices, much less consolidate operation of the appliances and devices into a single, controllable system. For example, garage door opener mechanisms open and close a garage door in response to a radio frequency control signal. The radio frequency control signal is typically generated and transmitted from a remote control that is sold with the garage opener. Therefore, a user wishing to control multiple appliances and/or devices such as multiple garage doors, or a garage door and a security gate is required to have multiple remote controls. There are few universal remote controls available for electronic devices such as garage doors.

In the field of wireless control of remote electronic systems, including home electronic systems, technological advances have been developed to improve convenience, security, and functionality for the user. One example is a trainable transceiver for use with the various remote electronic systems, capable of receiving a wireless control signal related to a specific function or task. A user trains the trainable transceiver by, for example, transmitting a signal from a third party wireless device, such as, a remote controller in the vicinity of the trainable transceiver. Trainable transceivers typically work by learning and storing a carrier frequency and associated data code used with the third party wireless device. For example, a remote control for a garage door typically has a specific frequency on which it operates as well as a data code, to prevent other devices from operating the garage door. The data code is wirelessly transmitted to an antenna on the garage door opener. The garage door opener may use a rolling code as the data code. A rolling code frequently changes the data code such as after each use or after a specified time interval. Therefore, a trainable transceiver must also learn the algorithm used by the remote electronic device to match the rolling code sent by the remote control. Different devices may work on different carrier frequencies and have different codes as well as different algorithms to create the rolling codes. Therefore, the trainable transceiver must work over a wide range of frequencies as well as be capable of learning a wide variety of algorithms associated with rolling codes and store all for later retransmission.

Various advantages exist with using built-in devices in a vehicle to control multiple remote electronic systems. Unlike your typical garage door remote, the trainable transceiver may be configured to not operate when the power to the ignition of the vehicle is off; the vehicle is locked; or in other selected instances to prevent unauthorized access to areas desired to be secured. In comparison, if an unauthorized person obtains a garage door remote, such as by breaking into a vehicle, that person can easily open the garage door or gain unauthorized entry to secured areas. Therefore, the use of a trainable transceiver improves safety by eliminating any unsecure remote controls. In this manner, the trainable transceiver can be conveniently mounted within a vehicle interior element (e.g., visor, instrument panel, overhead console, etc.) and can be configured to operate one or more remote electronic systems. Therefore, it is desirable to add as much functionality as possible to the trainable transceiver by configuring the trainable transceiver to operate more devices than the number of preset buttons. More specifically, it is desirable to operate numerous remote wireless devices, such as home electronic systems, without adding additional preset buttons to the interface in the vehicle.

Many vehicles already include trainable transceivers for controlling various remote electronic devices. Trainable transceivers in vehicles generally have a set number of physical buttons, which function as preset buttons that perform a single, specific task that has been previously programmed by the user. One such system is Homelink™, owned by Johnson Controls, Inc., in which a trainable transceiver is able to "learn" characteristics of received control signals, such that the trainable transceiver may subsequently generate and transmit a signal having the learned characteristics to a remotely controlled device. An example of a wireless control system having a transceiver circuit 34 and a remote electronic system (remote device) also having a transceiver circuit 33 is illustrated in FIG. 2. One such system is disclosed in U.S. Pat. No. 5,903,226, hereby incorporated by reference. Typically, the trainable transceiver has at most three buttons, each button allowing the programming of a single function or task. More specifically, the trainable transceiver only stores a specific frequency and a specific code or a rolling code with each preset button. Therefore, the total number of available tasks that a trainable transceiver may perform is limited directly by the number of preset buttons, and a trainable transceiver having three preset buttons allows only for three tasks or functions to be programmed and used. For example, an exemplary trainable transceiver with three preset buttons could control a first garage door, a second garage door, and one set of exterior lights, or any other variety of three specific tasks or functions.

However, if the operator of the vehicle has a second home or second location, such as a commercial business where it is desirable to control functions remote from the vehicle and without leaving the vehicle, current devices have no ability to easily add these various functions and tasks, without adding buttons to the device. Even for individuals only concerned with controlling devices at a single location, it still may be desirable to control more than the limited number of tasks individually associated with the preset buttons.

While the trainable transceiver works well for vehicle operators in controlling a limited number of electronic devices, such as home electronic devices remote from the vehicle, the operator may desire to control more devices than the trainable transceiver allows. While it is possible for the manufacturer of the trainable transceiver to add additional preset buttons to the interface of the device, such additions may reduce the aesthetic appeal, and increase the difficulty in the operator easily and efficiently selecting the correct preset button. In addition, the more buttons that are added to the trainable transceiver, the harder it may be for the operator to easily select and control a specific task or function.

Currently, users may forget what preset button is related to a specific task or function if they are not frequently used. Therefore, a user may push the first preset button to open a garage door and accidentally pushes the second preset button performing a task or function that is not desired. The buttons are not specifically named or related to a particular task as different individuals and users may have different desired tasks to be programmed with the buttons. In addition, in some instances, it is difficult to easily determine while the car is in motion if a pressed button has completed its task such as a button associated with opening a security gate that needs to be pressed as the vehicle approaches the drive having this security gate. Furthermore, currently all of the systems require physical interaction and the ability to have hands-free functionality has not been accomplished. In some circumstances, certain people for ventilation or allowing the ingress and egress of pets from secured areas may desire for a garage door to be left partially open such as 12 to 18 inches off of the ground. As part of this, the user must manually start and stop the door in the proper position which at times is difficult due to delays in pressing the button or the system in communication with the remote device.

Further advances are needed in the field of wireless control of home electronic systems, particularly in the case of using automotive electronics to control home electronic systems. As automotive manufacturers are adding increased electronic systems to the vehicle to improve convenience, comfort, and productivity, simplifying the interface and control of these electronic systems is also becoming increasingly important.

SUMMARY OF THE INVENTION

This invention relates generally a system and method for a trainable transceiver having an integrated interface connection vehicle modules and in particular, to a wireless trainable transceiver with an integrated interface allowing connection to a human to machine interface and a GPS device.

The present invention is directed more specifically to a wireless control system for controlling remote electronic systems, the wireless control system comprising: an operator input device having a plurality of preset buttons; a transceiver module including an antenna; a control module including a plurality of memory slots associated with the plurality of preset buttons; and wherein the memory slots are capable of storing a control frequency, a data code and a vehicle position indicator. The plurality of memory slots are greater in number than the plurality of preset buttons and an interface module is in communication with the control module and a vehicle position determination device.

The vehicle position determination device is selected from at least one of a navigation system, a compass, and a proximity device. The vehicle position device is capable of providing a geographic position, location, heading, or other method of locating the vehicle relative to the remote electronic system. The control module associates the geographic position with a selected set of the plurality of memory slots and wherein the select group of the plurality of memory slots is equal to the number of the plurality of preset buttons.

The plurality of memory slots are made up of individual sets of memory slots, each set of the memory slots having a shared geographic position identifier and wherein each set has approximately equal in number to the number of memory slots as the plurality of preset buttons on the input device.

The shared geographic position identifier in each memory slot includes a geographic location which may be provided by a navigation system. The shared geographic position may be in the alternative or in combination be a heading from the compass. More specifically, if the vehicle position determination device includes a navigation system and a compass, the navigation system may supply a first geographic position identifier of the location of the vehicle and the compass may supply a second geographic position identifier of the heading of the vehicle, which in combination allows multiple memory slots to be automatically associated with and correctly chosen by the wireless control system for use in close geographic proximities, such as two garages located near each other, but having different angle of approach.

The control module may be configured to allow access to the memory slots only when the actual geographic position of the wireless control system is within a specified range of the vehicle position indicator stored with the individual memory slots, during programming of the tasks associated with the preset buttons.

The present invention also includes a wireless control system for wireless control of a remote electronic system. The wireless control system includes an operator input device having a set number of programmable buttons and at least one function memory slot associated with each of the programmable buttons; a transmitter module configured to transmit a wireless control signal having control data, which will control the remote electronic system; an interface module configured to receive geographic proximity data; and a control module coupled to the transmitter circuit. The control circuit selects which individual function memory slot is active in relation to each of the programmable buttons based upon geographic proximity data received by the interface circuit.

The present invention further relates to a wireless control system for wireless control of a home electronic system having an operator input device with a set number of programmable buttons and each of said set number of programmable buttons being capable of sending a unique activation signal when pressed. An interface module is configured to receive geographic location data. A control module is in communication with the interface module and the operator input device, and is configured to receive the unique activation signal from the interface module. The control module stores in at least one function memory slot, each of the unique activation signal associated with each of the programmable buttons and wherein the control module selects which function memory slot to access and use based upon the geographic location data.

The present invention also includes a method of training and using a wireless control system having a plurality of preset buttons on a vehicle for wireless control of a remote electronic system, comprising the steps of: receiving a request to begin training from a user at a first location; receiving a first vehicle position indicator from at least one of a navigation system and a compass; acquiring a control frequency and a control code; and storing the control frequency and the control code in a memory slot tagged with the first vehicle position indicator.

The method further includes the steps of: receiving a request to begin training from a user at a second location; receiving a second vehicle position indicator from at least one of a navigation system and a compass; acquiring a control frequency and a control code; and storing the control frequency and the control code in a memory slot tagged with the second vehicle position indicator.

The step of receiving a second vehicle position indicator from at least one of a navigation system and a compass further includes the step of receiving a vehicle position indicator that is a geographic location from the navigation system. Furthermore, the step of receiving a second vehicle position indicator from at least one of a navigation system and a compass may further includes the step of receiving a vehicle position indicator that is a heading from the compass. The step of receiving a first vehicle position indicator is automatically performed by the wireless control device without input from a user.

The method may further include the steps of: at the first location receiving a control request; automatically accessing the control frequency and the control code in the memory slot tagged with the first vehicle position indicator; and automatically transmitting the control frequency and the control code in the memory slot tagged with the first vehicle position indicator. The method may further include the steps of: at the second location receiving a control request; automatically accessing the control frequency and the control code in the memory slot tagged with the second vehicle position indicator; and automatically transmitting the control frequency and the control code in the memory slot tagged with the second vehicle position indicator. In addition, the method may at a third location receive a control request and prevent the wireless control system from transmitting the control frequencies and the control codes in the memory slots tagged with the first and second vehicle position indicators.

The invention also relates to a method of training and using a wireless control system having a plurality of preset buttons on a vehicle for wireless control of a remote electronic system, comprising the steps of: providing an operator interface having at least one button; storing a control frequency and a data code for performing a control task associated with a first button of the at least one button and wherein the control frequency and data code are stored with an automatically obtained first vehicle position indicator; storing a control frequency and a data code for performing a control task associated with the first button of the at least one button and wherein the control frequency and data code are stored with an automatically obtained second vehicle position indicator; receiving a request for performing the control task associated the first button; automatically determining current position of the wireless control system; selecting and performing the control task from said step of receiving a request, if the current position of the wireless control is within a specified distance range of at least one of the first and second vehicle position indicators, and wherein said step of selecting includes the step of determining which programmed location is the closest to the current location.

The step of performing the control task may further includes the steps of determining the closest of the first and second vehicle position indicators; determining if the closest of the first and second vehicle position indicators is within a specified distance range of the current position of the wireless control; and performing the task only if within the specified distance range from said step of determining if the closest of the first and second vehicle position indicators is within a specified distance range of the current position of the wireless control.

The present invention may also be directed to a wireless control system in a vehicle having an instrument panel, a center console and a vehicle position determination device, for wireless control of a remote electronic system, the wireless control system comprising: a display located within at least one of the instrument panel and the center console; a transmitter module configured to transmit a wireless control signal having control data which will control the remote electronic system; an interface module in communication with the vehicle position determination device and wherein the interface module receives current geographic position data; and a control module in communication with the display, the interface module, and the transmitter module, and wherein the control module receives geographic position data from the interface module and wherein the control module upon determining that the current geographic position data is within a specified range of a preprogrammed geographic position communicates a prompt to the display relating to the preprogrammed geographic location.

A method of training and using a wireless control system located in a vehicle having an instrument panel, a center console and a vehicle position determination device, the wireless control system having a control module, an interface module and a transmitter module, the method comprising the steps of: programming the wireless control system with a specific function and wherein the function has a programmed geographic location tag obtained from the vehicle position determination device; providing a current vehicle geographic position from the vehicle position determination device to the control panel via the interface module; determining if the current vehicle geographic position is within a specified distance of the programmed geographic location tag; providing an output from the control panel to the display upon determining that the current vehicle geographic position is within a specified distance of the programmed geographic location tag during the step of determining if the current vehicle geographic position is within a specified distance of the programmed geographic location tag; and displaying the output from the control module on the display.

The method may further include the steps of receiving an input in response to the output from the control panel to the display; and transmitting with the transmitter module the specific function related to the received input upon receiving the input. Of course, the step of receiving an input may further include the step of registering a contact to the display in the vicinity of the output displayed or a press of a button associated with the output from the step of displaying the output.

The step of displaying the output from the control module on the display is expected to occur automatically and without any interaction with the user. Therefore every time that the vehicle is in position of a preprogrammed remote electronic system, the vehicle can provide status alerts for the user to select on the display, such as that when the user is approaching the house, the system overrides what is currently on the display and pops up an alert that may be selected. Of course, this functionality may be disabled if the user doesn't normally use the programmed specific function. If a variety of inputs are programmed into the control system, than each of these could pop up. The system may learn from the most commonly selected device and provide a more prominent display of the most used icon it displays relating to the specific function.

To better tailor the control system to an individual user, so that the system does not pop up alerts when the vehicle is heading away, various vehicle modules may be used to determine speed and direction and prevent display of certain specific functions. Additionally, if a specific function has already been transmitted by the user, than that function may disappear from the display as the vehicle picks up speed because it is unlikely that the user will select it again. To even further tailor when specific functions are displayed, the control system may use as the vehicle position device includes both a GPS device and compass. The use of both allows the programmed geographic tag to include a heading associated with the vehicle. Of course, it may not be a separate compass, but the heading direction could be provided by the navigation device.

The step of displaying the output from the control module on the display may further include the step of providing a soft key popup on the display. The step of providing a soft key popup on the display may also further include the step of programming a unique name to be associated with the specific function. More specifically the step of providing a soft key popup on the display further includes the steps of retrieving the unique name from the step of programming a unique name; and graphically outputting the unique name on the display to label the soft key popup with the unique name. Of course programming of multiple specific functions, each having a programmed geographic location tag; and displaying each specific function when the current geographic position of the vehicle is in the desired geographical proximity to the programmed geographic location tag may occur. In addition, the system may allow the programming a unique name for each specific function; and displaying of each unique name with each specific function displayed during the step of displaying each specific function when the current geographic position of the vehicle is in the desired geographical proximity to the programmed geographic location tag.

The step of receiving an input discussed above, may include the steps of: receiving a modified control input; and transmitting the modified control input. Furthermore, the step of receiving a modified control input may be the user inputting that they want the specific function to be automatically modified as previously programmed. If the user wants the specific function to be automatically modified, it would generally include the steps of programming the modified specific function; and transmitting the modified specific function upon selection of a modified input. For example, the specific function to be modified may be the opening and closing of a garage door, such that the modified version, which may be selected by a specific additional input, or be preprogrammed to occur every time, is programming a garage door to only open or close partially. This allows ventilation and the ingress and egress of pets.

The system may include a method of allowing all of the commands to occur through voice prompts and receiving a voice command Separately or in addition to the voice commands, the system may provide graphical representations of the current specific function to be performed, or the specific function as it is performed. More specifically, the icon of a specific function that represents a garage door may be represented by a garage door icon, which may show opening or closing motion while a task or function is being performed. Of course, during the step of programming a unique name, the method would also includes the step of programming or selecting a graphical representation of the specific function.

In some cases, it may be desirable to receive a status update or display the current status of the function. This would be above and beyond simply showing that a function is being performed and would include the steps of transmitting the specific function to the remote device; receiving a status update from the remote device; and providing an output to the display representing the status update received from the remote device.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
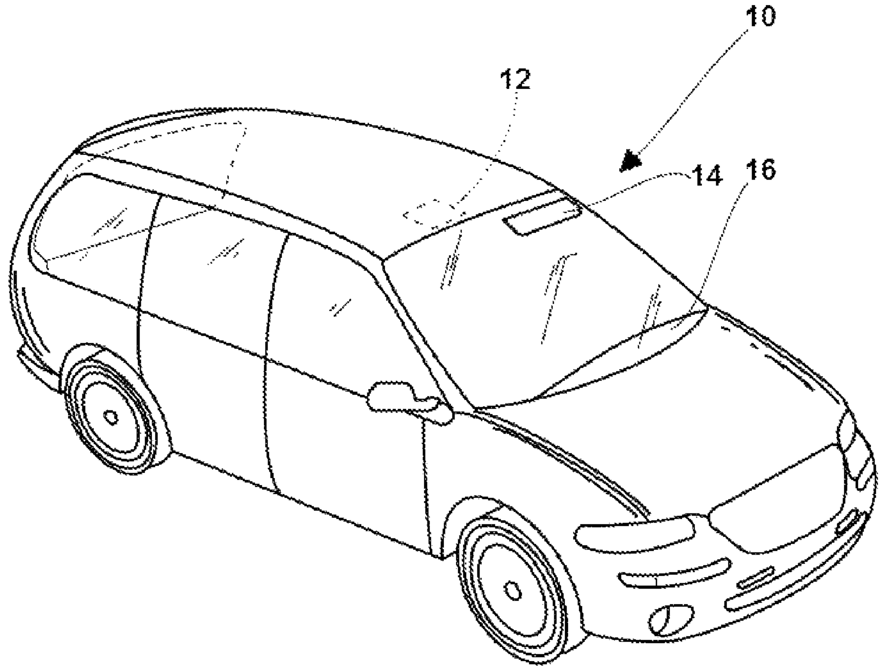
FIG. 1 is a perspective view of an exemplary vehicle including a wireless control system.
Figure 2:
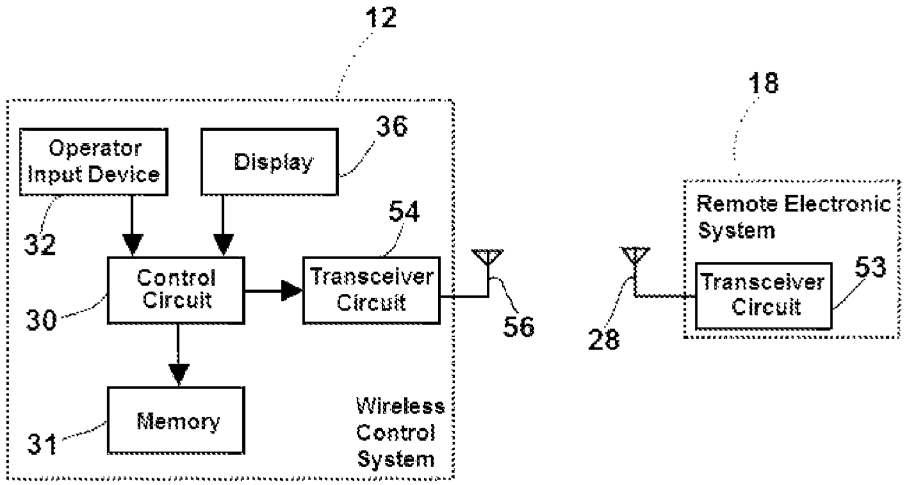
FIG.2 PRIOR ART
FIG. 2 is an example of a wireless control system having a transceiver circuit in communication with a remote electronic system in accordance with the prior art.
Figure 3:
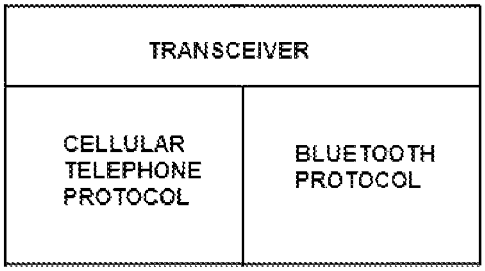
FIG. 3 shows an example of a trainable transceiver of a wireless control system in accordance with the prior art.
Figure 4:
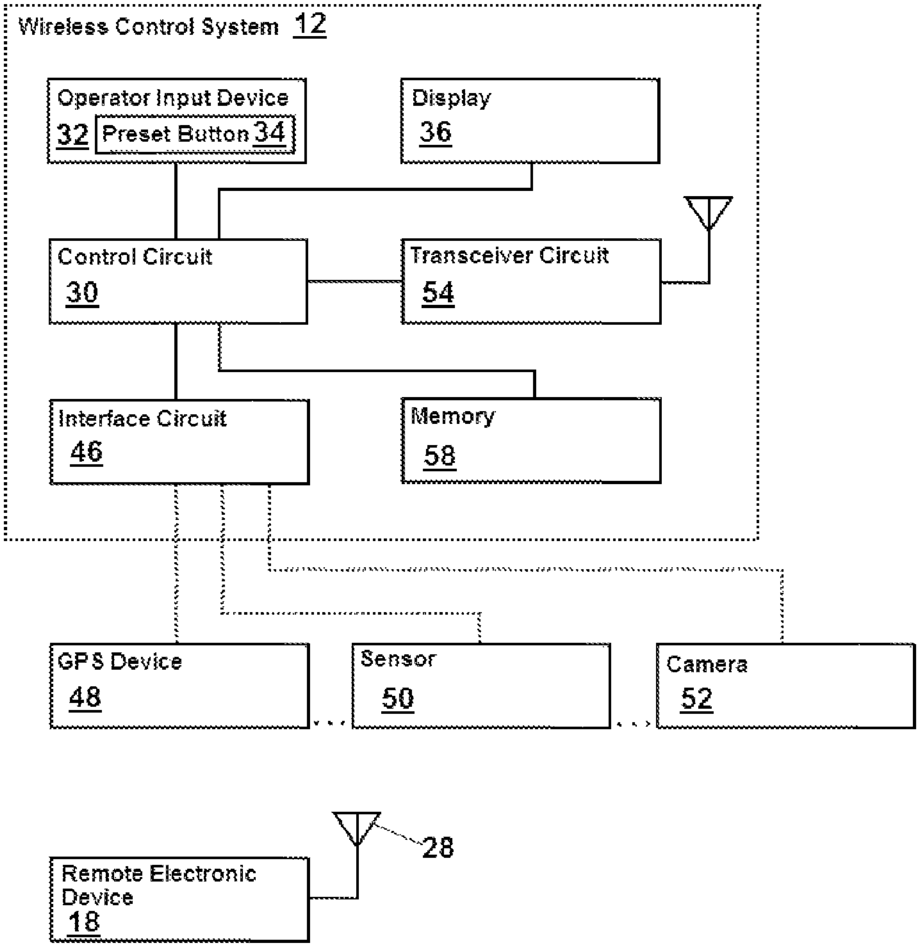
FIG. 4 illustrates an exemplary wireless control system having an interface circuit in accordance with the invention.

Referring first to FIG. 1, a vehicle 10, which may be an automobile, truck, sport utility vehicle (SUV), mini-van, or other vehicle, includes a wireless control system 12. The wireless control system 12 may be located as desired in the vehicle 10, such as illustrated in an overhead console, a visor 14, instrument panel 16 within an infotainment system or to the other vehicle interior elements. Alternatively, one or more of the elements of wireless control system 12 may be mounted to other vehicle interior elements or could even be mounted to a key chain, keyfob or other handheld device.

Referring now to FIGS. 4-9, the wireless control system 12 is illustrated along with a remote electronic system or device 18, which as described above may be any of a plurality of remote electronic systems or devices, such as, a garage door opener, a security gate control system, security lights, home lighting fixtures or appliances, or a security system. The wireless control system 12 in the exemplary embodiment is located in a vehicle 10, such as an automobile, truck, motorcycle, van, or boat. For example, the remote electronic system 18 may be a garage door opener, such as a garage door opener having a lighting control system. The remote electronic system 18 includes an antenna 28 for receiving a control signal from a remote control such as the wireless control system 18. The wireless control signals typically include control data, such as data codes or rolling codes to control the remote electronic device 18, sent on a specified frequency. The remote electronic device 18 may also be located on another vehicle, such that vehicles, each with the prescribed wireless control system 12 and/or remote device 18, can communicate with one another. Any variety of wireless signals may be used, including but not limited to ultra-high frequency (UHF) band of the radio frequency spectrum, or infrared signals or other wireless signals.

The wireless control system 12 typically includes a control circuit or module 30 configured to control the various portions of system 12, to store data in memory 58, to access and use preprogrammed functionality in operation of the remote device 18 by the system 12. Control module 30 may include various types of control circuitry, digital and/or analog, and may include a microprocessor, microcontroller, application-specific integrated circuit (ASIC), or other circuitry configured to perform various input/output, control, analysis, and other functions to be described herein. The present invention uses a memory storage system that may include or be tied to a stored geographical location. The memory storage may also include compass directions or a distance sensor that provides a distance to another device or even a data chip remote from the vehicle tied to a specific memory location as described in further detail below. In regards to a stored geographical location, each preset button 34 when programmed and thereby associated with a memory slot 59 in the memory having a control frequency and control code. In vehicles equipped with a navigation or GPS device 48, the memory slot will also automatically store or be tagged with geographic data such as the position data of the vehicle. As further described below in the method of programming and use, the position data is automatically stored with no additional input from or programming steps by the user. As such, each preset button 34 may include as many functions or tasks as desired and be programmed and operated seamlessly by the user without any additional configuration over existing devices, so long as each function or task programmed with a specific button 34 has different position data tagged or associated therewith. Therefore, control circuit when programming the device enters, tags or associates the geographical location with the control code and frequency and any use of the preset button 34 within a specified distance from the geographical location tagged during programming will access the stored control frequency and data code at that nearest geographical location and provide it to the remote device as desired, so long as the current geographic position is within a specified distance. Therefore, each preset button 34 may include as many functions or tasks as possible for the user, without the need for the user to select which memory is associated with the preset button 34. If the input device 32 only includes three buttons, the user would program three buttons at a first geographical location and the position data would be associated with the memory of each button so that it is only available for use within a desired range of the geographical location. This also provides additional safety features as a preset button 34 and more specifically the control module 30, may be configured to not provide the control frequency and data code for other devices to learn, if the vehicle is remote from the geographical location set during programming. For example, the user valets their vehicle at a location remote from a geographical location where the preset buttons 34 were programmed and any memory functions associated with a preset button 34 are not available for use or capture by unauthorized third party devices as they would be locked out from use. Manufacturers can set the desired distance range from the programmed geographical location such as, for example, 300 to 500 feet for garage door openers. Of course, this distance could vary depending upon the type of device being used. Whenever the user is at a new geographical location, the preset buttons 34 may be programmed and in view of the tagged geographical location with each memory slot, any prior programming of the preset buttons 34 is not overwritten (unless occurring within the specified distance range of a previous geographical location used in programming) and as viewed by the user, they are able to program as many devices as desired or up to three different tasks on a three button wireless control system at each different geographical location.

The control module 30 is coupled to an operator input device 32 which includes one or more preset buttons 34 (see FIGS. 7-9 and 11), but may alternatively include other user input devices, such as, a touch screen, switches, knobs, dials, etc., or even a voice-actuated input control circuit configured to receive voice signals from a vehicle occupant and to provide such signals to control circuit 30 for control of system 12. It is also appreciated that the display 36 and operator input device 32 may be the same component. For example, the operator interface device 32 may also be a touch screen interface on the instrument panel, infotainment system or navigation screen or hard keys adjacent to and associated with the displays of such devices.

Figure 10:
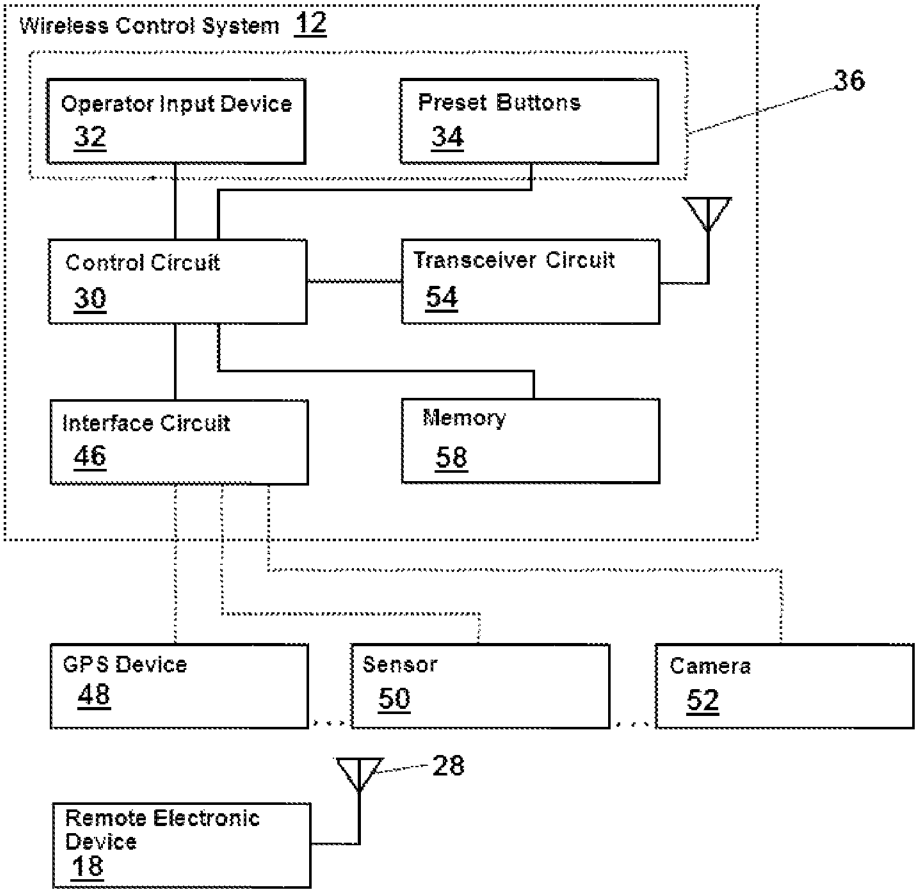
FIG. 10 is a schematic diagram of a wireless system with a combined input device and display.

More specifically, the control module 30 may be further coupled to a display 36 which may be any form of output device visible by an operator or passenger of the vehicle. For example, display 36 may be an LED, such as the display element 36 in FIG. 8 or any other display or display element(s), such as a liquid crystal display (LCD), a vacuum florescent display (VFD), etc., or the exemplary display element in FIG. 11. Although not shown in FIG. 4, the control circuit 30 may also be connected to an audio output device, or connected through interface circuit 46 to an audio input/output device, as illustrated in FIG. 10.

Wireless control system 12 further includes an interface circuit or module 46 configured to receive data from one or more sources, such as a navigation device 48, a vehicle sensor 50 (e.g. radar sensor, RF sensor, sonar sensor, capacitive sensor, field sensor, photoelectric sensor, pressure sensor, or any other sensor that can be used to provide data about the vehicle including navigation data and otherwise), camera 52, and/or other sources of navigation data, such as gyroscopes, etc. Interface module 46 provides an interface for the wireless control system 12 to connect the control circuit 30 with vehicle modules, such as GPS device 48, sensor 50, camera 52, etc. signals to control circuit 30. The interface module may be part of the control module 30 or a separate module as illustrated in the Figures. The connection between the interface module 46 and the vehicle modules (48, 50, 52) may be wired or wireless. It is appreciated that the vehicle modules are not limited to the specific examples described or illustrated herein. Any vehicle module can be configured to interface with the wireless control system 12, including modules such as input/output devices, voice recognition devices and hands free telephone (HFT) devices or non-vehicle modules such as cell phones, PDAs and the like. Interface module 46 is an electrical connector in this exemplary embodiment having pins or other conductors for receiving power and ground, and one or more navigation data signals from a vehicle power source and one or more navigation data sources, respectively, and for providing these electrical signals to control circuit 30.

Vehicle position determination device 48 is expected to be and is described herein as a GPS receiver or navigation system configured to receive positioning signals from GPS satellites, to generate location signals (e.g., latitude/longitude/altitude) representative of the location of wireless control system 12, and to provide these location signals to control circuit 30 via interface circuit 46. The vehicle position determination device 48 may also or instead use a compass configured to receive signals representative of the Earths magnetic field and provide a vehicle heading to the interface module 46 and/or control module 30. The compass may use any magnetic sensing technology, such as magneto-resistive, magneto-inductive, or flux gate sensors. The vehicle heading may be provided as an octant heading (N, NE, E, SE, etc.) or in degrees relative to North, or in some other format. If the car is equipped with a compass heading signal, this may also be provided to the interface module 46 and be used in the identification of the memory. Use of the compass heading may be useful for vehicles without a GPS navigation device capable of providing a geographical location to the interface module 46 such that each memory location is incapable of being tagged with a specific geographical location. Instead, the compass heading would allow the wireless control system to tag the compass heading to the various memory slots because it is expected that the user of the vehicle will have substantially the same compass direction in entering and exiting garage doors or approaching other remote devices with the vehicle. While use of the compass heading is much more limiting than vehicles with GPS devices that provide geographical locations, it allows for at least two if not four memory slots for each preset button 34, such that a three button system could have up to twelve or in some cases, more functions or tasks programmed. For example, if a vehicle at a first home enters the driveway facing north, the system may select the memory location associated with the vehicle facing north and control those devices. If at a second location, the vehicle enters the driveway facing southeast, it is possible for a second set of memory locations to be associated with the preset buttons 34 such that the second set of remote electronic devices may be controlled and thereby control more devices 18 than the number of preset buttons 34. The additional compass direction being tagged to a memory location is even more useful in the instance where it is combined with geographical location data in the memory slot. For example, if more than three devices on a three-button system are desired to be controlled, if the compass direction is added and the vehicle for the fourth device is faced in a slightly different direction such as a different alignment for a garage door or a security gate before entering the garage door, the system may have at a single geographical location more functions or tasks available than if the memories were solely tagged with geographical location data. More specifically, the exemplary car entering a driveway which has a security gate may have an alignment of north but is in close enough geographical proximity to the garage door such that the number of remote electronic devices desired to be controlled is more than the number of available of preset buttons 34. As the memory is tagged with a compass direction of north as well as the geographical location, the security gate may be opened with the driver proceeding up the driveway and upon angling the car to enter the garage at a different direction, such as heading west, even though the geographical location is within range of the security gate, the compass direction tag allows for even more functions or tasks to be programmed for the same preset button. Therefore, the compass direction heading may further supplement GPS devices.

In some systems whether or not a GPS or navigation device is used to tagged memory locations with geographical data, the wireless control system 12 may also use a distance sensor or read surrounding wireless signals to determine that different memory locations need to be accessed. For example, the wireless control system 12 may use radio frequency id (RFID) tags that are attached to the various electronic remote devices. The system may read an RFID tag associated with a remote device and determine which set of preset button 34 memories are associated with the individual preset buttons 34. This allows for easy increase in the number of memory locations associated with the preset buttons 34. The system also could instead of using RFID tags, read available surrounding wireless signals or strengths such as determining the WiFi network in the vicinity or with some remote systems capable of providing communication determine the device, however, this system is more problematic in that the wireless signals in identifications may readily change especially in the areas with having higher home or commercial densities.

The wireless control system 12 further includes a transceiver module or circuit 54 including transmit and/or receive circuitry configured to communicate via an antenna 56 with remote electronic device 18. Transceiver module 54 is configured to transmit wireless control signals having control data which will control the remote electronic device 18. The transceiver module 54 is configured, under control from the control module 30, to generate a carrier frequency at any of a number of frequencies in the ultra-high frequency range, typically between 260 and 960 megahertz (MHz) although other frequencies could be used, wherein the control data modulated on to the carrier frequency signal may be frequency shift key (FSK) or amplitude shift key (ASK) modulated, or may use another modulation technique. In the example of the remote electronic device being a garage door, the control data on the wireless control signal may, for example, be a fixed code or a rolling code or other cryptographically encoded control code suitable for use with remote electronic device 18.

Figure 8:
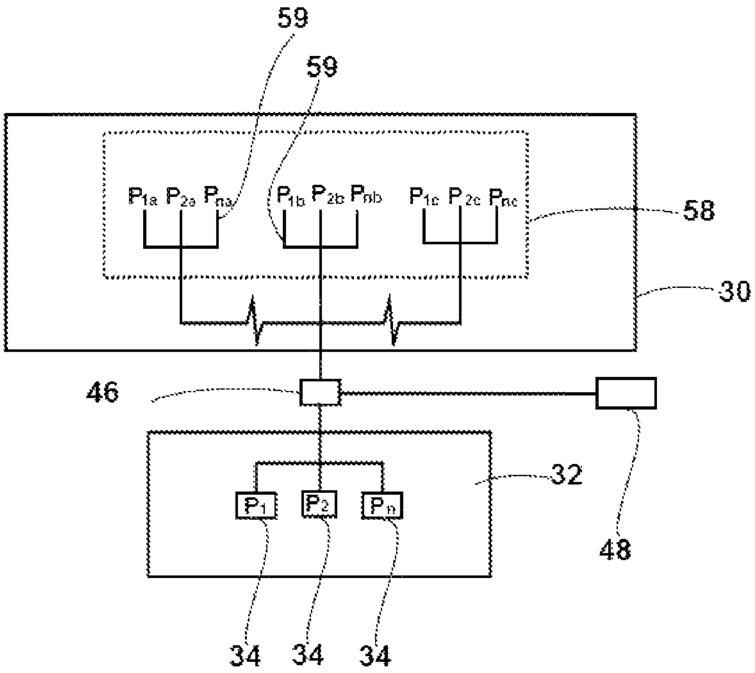
FIG. 8 is a partial schematic representation of trainable transceiver in accordance with the present invention showing multiple memory locations associated with each preset button.
Figure 9:
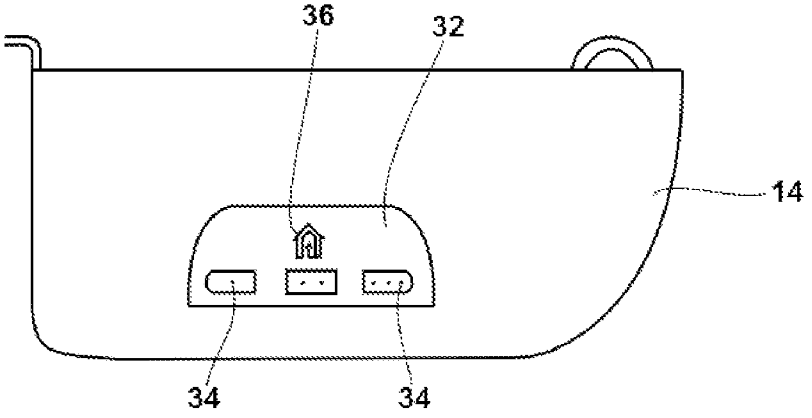
FIG. 9 is a schematic diagram of an exemplary visor having the interface device of the wireless control system mounted thereto.
Figure 11:
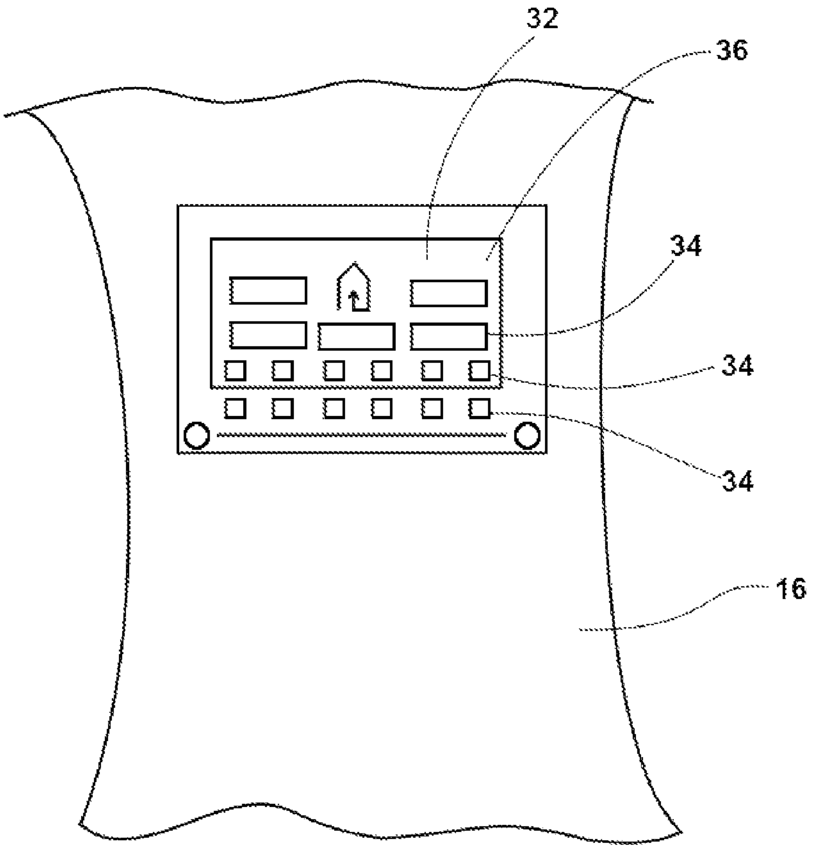
FIG. 11 is an exemplary illustration of an infotainment system display as the input device.

Referring now to FIG. 9, an exemplary wireless control system 12 is illustrated coupled to a vehicle interior element, namely a visor 14. The visor 14 is of conventional construction, employing a substantially flat, durable interior surrounded by a cushioned or leather exterior. The wireless control system 12, specifically the input device 32, is mounted to the visor 14 by fasteners, such as, snap fasteners, barbs, screws, bosses, etc. and includes a molded plastic body 58 having three push button switches disposed therein. Each of the switches includes a respective back-lit icon 40, 42, 44. The body 58 further includes a logo 60 inscribed in or printed on body 58 and having a display element 30 disposed therewith. During training and during operation, display element 38 is selectively lit by the control module 30 to communicate certain information to the user, such as, whether a training process was successful, whether the control system 12 is transmitting a wireless control signal, etc. FIG. 8 is merely exemplary, and alternative embodiments may take a variety of shapes and sizes, and have a variety of different elements, such as the unit integrated into a center console infotainment or navigation system as illustrated in FIG. 11 or within a mirror (not illustrated), such as the rearview mirror.

Figure 5:
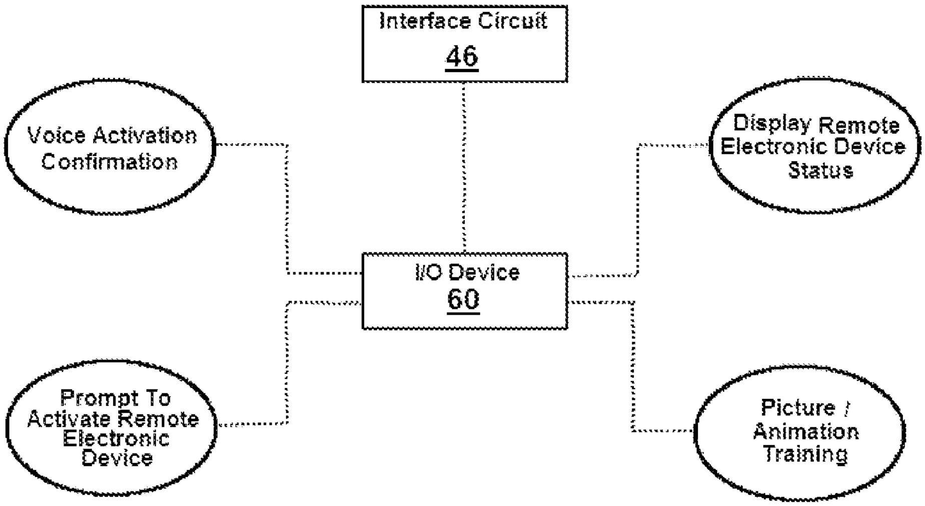
FIG. 5 illustrates an exemplary input/output device connected to an interface circuit in accordance with the invention.
Figure 6:
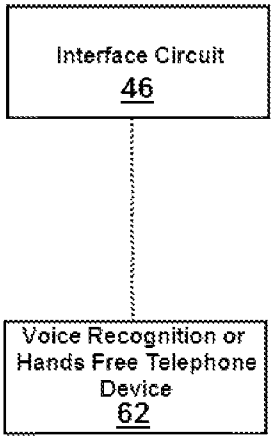
FIG. 6 illustrates an interface circuit connected to a voice recognition or hands free telephone device in accordance with the invention.

FIGS. 5 and 6 illustrate an exemplary input/output device connected to an interface circuit in accordance with the invention. The interface circuit 46 of the wireless control system 12 may be used to connect (connect throughout this document is defined as any connection, including wired or wireless) an input/output device 60 (e.g. a remote touch screen display). Input/output device 60 could therefore be used as an input and/or output device to display the status of the remote electronic device 18, which is already connected to the wireless control system 12 through interface module 48. For example, upon activation a garage door, status information may appear on the I/O device 60 that indicates the garage door is opening, closing, etc. The input/output device 60 may also provide a means for assisting in training procedures for the trainable transceiver. Traditionally, in order to "train" the trainable transceiver and "learning" procedure is used, in which a button sequence is applied to the trainable transceiver to "learn" the frequency emitted by the remote electronic device. For example, the trainable transceiver learns the frequency and code associated with a remote control of a garage door, such that the remote control is no longer necessary to operate the garage door.

In this exemplary training method, the input/output device 60 may provide or display a picture, animation, video, etc. that assists the operator in the training procedures. For example, the input/output device 60 may step an operator through the button sequence in order to train the trainable transceiver, thereby providing the operator with an easy and quick way to train the transceiver.

More specifically, the display 36, such as the screen of a navigation device 48 or an infotainment system display or even a separate display only used by the wireless control system 12 may be used to provide audio visual feedback to the user. Providing training videos or step-by-step actions to be performed by the user is helpful in that the user does not need to refer to a separate owner's manual. The training may be configured as a video or more preferably as step-by-step instructions that are illustrated on the display 36 for the user and require the user interaction before proceeding to the next step. Even more preferably, the training videos are interlinked with the wireless control system 12 such that as the user is receiving the training, the desired functions are being accomplished at the same time. In addition, this allows the system to ensure that the user is properly following each of the steps. More specifically, the wireless control system 12 may be put into a training mode by the user. Upon entering a training mode, the user would select what type of programming or training regarding the use of the wireless control system needs to be performed. To aid with the training and so that a user does not need to access the manual to determine what buttons on the input device 32 to press, a button clearly labeled training on the center stack or input device may be used. Upon pressing the training button, the device would display on the display 36 a menu of options related to training. For example, the user may select a training regarding programming a new remote device. To provide greater efficiency, the training may be interlinked with the control module, including the input device so that the step-by-step instructions are automatically advanced upon correctly finishing a programming step. Therefore, to properly program the transmitter, during training the wireless control system 12 would request the user be in the proximity of the remote electronic system 18 and include having the handheld transmitter or remote control for the remote electronic system 18. The training module would on the display 36 show which buttons of the preset buttons 34 should be pressed and held so that the wireless control system 12 is ready to program a new device. If the wireless control system is linked to the training videos, by solely selecting training on the screen, programming the system 12 may occur by automatically being placed into a ready-to-program state. The user would then hold the remote control or handheld transmitter within the desired proximity to the wireless control system 12 typically in close proximity to the operator input device 32. Following the instructions, the user would typically simultaneously push the handheld transmitter button and the desired preset button 34 as instructed by the training instructions. Upon an indicator light or otherwise signaling that data is received from the handheld transmitter or remote control, the training instructions would proceed to the next step automatically. If, after a certain time period the desired programming of the device has not occurred, the training video would set up the system to redo the prior steps. After learning the control frequency and a data code, the training instructions may ask if a rolling code is present. As most remote electronic systems have rolling codes since 1996, training instructions could instruct the user to try the preset button 32 to see if the garage door or other remote device is activated or as part of the training process perform a test of the garage door and ask the user if the garage door opened or closed. The user may select that neither has happened at which time the training instructions and integration with the wireless control system would automatically instruct the user to prepare to enter a rolling code. As the next steps typically include tasks outside of the vehicle, the display 36 could illustrate these tasks and even provide pictures of, for example, various garage door units so that the user can select in determining where a training button is on the garage door opener. Upon completion of entering a rolling code, the system may automatically test the garage door or upon a prompt from the user, test the garage door and request the user to instruct if the garage door activates as desired. One benefit of using colored display screens such as a navigation device or some infotainment displays is that pictures of each individual step including pictures of exemplary remote devices and the location of training buttons in relation to the remote devices may be provided to the user. This eliminates much of the need to find the owner's manual for both the vehicle as well as a particular garage door opener which may not be readily available. For example, the training system may ask the user what type of remote device, followed by what brand name, and followed by a request for model number or a selection of pictures.

Several exemplary training steps can be performed by the user. System 12 is trained to learn the location of remote electronic system 18, which may be defined as the location of one or more of a garage door, a security gate, a home lighting or appliance element, a home security system, the location of the home associated with the remote electronic system 18, the location of the antenna 28, or any other location associated with the remote electronic system 18. In this exemplary embodiment, the system 12 learns the location of the remote electronic system 18. The user actuates one of the switches 34 to change the mode of the wireless control system 12 to a training mode. With the system 12, and more particularly the antenna of GPS receiver 48, positioned at the location of the remote electronic system 18, the system automatically or the user actuates one of the switches 34 to command the control module 30 to take a location reading from GPS receiver 48 and to store this location information in memory, preferably in non-volatile memory, in order to train the system 12 to learn the location of home electronic system 18.

Having trained the system 12 to identify the location of home electronic system 18 using GPS positioning signals or by otherwise training system 12 to learn the proximity or distance between system 12 and system 18, system 12 may then be used in its operative mode to automatically select what memory is associated with a preset button 34 based on the proximity between system 12 and system 18. For example, when GPS positioning signals are used, during normal vehicle driving, the control module 30 continuously monitors the location of the vehicle 10 and, when the vehicle 10 is within a predetermined distance (e.g., 5 miles, 1 mile, 2 blocks, etc.), the control module 30 accesses the programmed functions associated with that geographic location, such that upon a press of the preset button 34 by the user, commands transceiver module 54 to transmit a wireless control signal having control data to control associated with the proximate one or more of remote electronic systems 18. In this exemplary embodiment, the wireless control signal is not transmitted automatically (i.e., still requiring the user to press a button).

Figure 7:
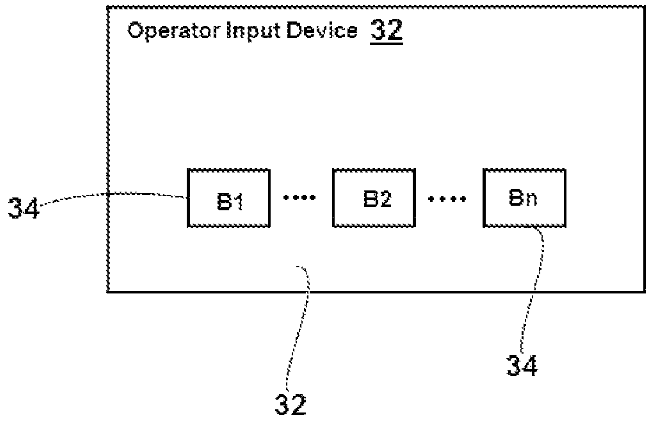
FIG. 7 illustrates a configurable input device in accordance with the invention.

As illustrated in FIG. 7, each preset button 34 may through the interface module 48 or some other mechanism be configured to have different memory locations associated with each preset button 34 depending upon the location of the vehicle. More specifically, using the navigation system input regarding the GPS location of the vehicle, the interface circuit may automatically cause the wireless control system to associate a specific group of stored functions or tasks with each preset button 34. The specific groups of tasks labeled P1A, P2A, P2A associated with P1, P2 and PNA as well as P1B, P2B and PNB for a second group and extending to the number of desired tasks such as P1C, P2C, and PNC up to the nth group. For example, the wireless control system 12 may include over a dozen groupings of stored data that are selected based upon the location of the vehicle to as few as two. The user of the vehicle will train the wireless control system similar to any other trainable receiver except that the vehicle needs to be located in proximity to the desired remote electronic system 18. Therefore, at a proximity to a first location, the wireless control system 12 will include a first grouping of memory associated with the preset buttons 34. When the vehicle travels to a second location, additional tasks or functions may be programmed into the preset buttons 34 creating a second grouping of tasks. This training of the trainable transceiver may continue on and fill as many locational slots as possible.

When training the wireless control system or in operation after such training, when the wireless control system 12 is within a first proximity of a first remote electronic system 18, the memory locations associated with that first electronic remote system 18 are automatically activated. While the wireless control system 12 does not automatically transmit to the remote electronic system 18 a command or function, it does automatically switch the function or task associated with a particular preset button 34 to the memory associated with the closest remote electronic system 18. If the vehicle travels away from the first remote electronic system 18 to the vicinity of a second remote electronic system 18, the memory locations associated with the preset buttons 34 will switch automatically and the user just has to push the proper preset button 34. For example, at a first location, the user may control a first garage door with preset button 34 P1 and when traveling to a vacation home or business also have a programmed second garage door in the slot of P1 that is automatically switched between the first location without additional input from the user, to a second location. The system 12 when programming automatically switches to a new memory location if the proximity to the particular remote electronic system 18 already programmed has changed by at least a minimum distance, such that the user only needs to push P1 for training and/or operation and the desired garage door or other device at both locations opens up when the vehicle is in close proximity.

To prevent confusion between memory locations, the wireless control system 12 may be configured that a specified distance from the first geographical position provided by the navigation system 48 must occur before a second set of memorized tasks may be programmed in association with a second location so that minor navigation errors in position that are common in all devices do not cause the device to accidentally switch to an unintended memory set. In view of the above, owners of multiple locations where it is desired to program in functions relating to electronic system 18 remote from the vehicle may program more than the given number of preset buttons 34 without adding additional buttons.

In the event that a GPS navigation signal is not available, the memory locations may be selected by reading the communication with local home electronic devices and looking for a particular match. For example, the wireless control system 12 may search the available home networks and determine that it is at a specific location along with which a specific memory slot 59 may be used with the preset buttons 34. The wireless control system 12 may learn and then update local wireless signals and other readings such that it may be used in vehicles without integrated GPS systems to read or create multiple memory locations thereby increasing the functionality of the device without changing the physical appearance by adding additional buttons. The present invention also allows dozens or hundreds of functions or tasks to be associated with a particular preset button 34. The user may not even be aware that the system is switching associated tasks and functions by location to create added memory slots that are automatically selected and associated with a preset button 34.

The distance minimally required by the system before new memory slots may be used may vary depending upon the accuracy of the GPS, the distance in which the common home electronic systems may transmit data or even the availability of other signals, and in some cases even determined by strength, or heading the vehicle. For example, a particular house which has four garage doors that need to be operated, the system may not be able to operate one of the four as it is in too close proximity to the other three to create additional memory locations for a three-button system based on geographical position data. Of course, the heading of the vehicle may be considered or user interface may be configured to have a manual override button which switches to the next closest location such that the fourth and possibly a fifth and sixth garage door may be controlled on a three-button system. In place of a manual override button as an additional switch, the system may have the user enter two short presses for a second memory location. If the house having at least four garage doors further includes a barn located some distance from the house, it is possible that based upon the user's location the vehicle is sufficiently certain that it is disposed sufficient proximity away from the original four garage doors, it may operate the garage door lights and other security systems on the barn based on vehicle position. More specifically, if the GPS is known to have an accuracy of ±50 feet, the system may determine when the vehicle is displaced 150 feet away from the original programming location, the vehicle is sufficiently far enough away to use the additional memory slots associated with each preset button 34.

In another embodiment, the input/output device 60 may be connected to any of the vehicle modules that interface with interface circuit 46. For example, if GPS device 48 is connected through interface circuit 46, it may also access input/output device 60. Input/output device 60 may, for example, by a display screen that is larger than the screen of the GPS device itself and provide a better viewing screen with improved clarity. This additional screen could also display data from the vehicle modules, as well as be used to provide the aforementioned pictures and animation for training purposes. Additionally, voice activated HMI interaction with input/output device 60 can provide both voice input and output, along with visual data on the display. In this context, when a voice command activates (or deactivates) a remote electronic device 18, activation (or deactivation) of the remote electronic device can be confirmed on the display or an audible confirmation can be sounded. For example, when the operator activates a garage door, the screen may display "Garage Door Opened." It is appreciated that although the vehicle modules, such as the GPS device 48 are shown as being interfaced with interface module 46, the connection is not limited to this embodiment. The vehicle modules may be integrated with the wireless control system 12 as a single unit, or connected in any other way as readily understood in the art.

FIG. 6 illustrates an interface module connected to a voice recognition or hands free telephone device in accordance with the invention. In this embodiment, interface module 46 is connected to a voice recognition device or hands free telephone device 62. This connection allows the wireless control system 12 to interface the voice recognition and HFT device 60 with other vehicle modules, as described herein. Voice recognition and HFT devices of this type are well known in the art.

FIG. 7 illustrates a configurable input device in accordance with the invention. The configurable operator input device 32 traditionally has three push buttons that operate the wireless control system 12. In this embodiment, the operator input device 32 may be expanded to include additional push buttons B1 to Bn. Alternatively, instead of push buttons, any other type of input device may be used. For example, the operator input device 32 may be a touch screen as illustrated in FIG. 11 in which button on the screen may be configured or reconfigured in any manner to fit the needs of a specific vehicle. It is also appreciated that operator input device 32 may be the same or a separate device from the input/output device 60. In addition to the configurable number of buttons, each button may be labeled to identify a remote electronic device for which it is associated with. For example, button B1 may be labeled "Home," button B2 may labeled "lights," etc. The names may be individually programmed by an operator, or may be transmitted by the remote electronic device 18 upon connecting to the wireless control system 12 automatically. Moreover, in conjunction with the GPS device 48, buttons may automatically be displayed, activated/deactivated, grayed out, etc. based on vehicle location. For example, if the control module 30 determines that you are more than 100 yards from your home or any other programmed location, which information is determined based on the control module 30 connection to the GPS device 48, the "Home" button on display 36 or I/O device 60 may disappear or be grayed out. Similarly, upon return to home, the button may reappear or be activated (no longer grayed) such that it may be used again. Alternatively, as you approach the home, the user may be prompted to open a garage door. This prompt could be in any form, display, audible, light, etc., and the operator can then decide which action to take based on the prompt. For example, a voice prompt or picture prompt, for any or all remote electronic devices (e.g. gates, doors, etc.) in the area may be automatically actuated when the operator is in proximity to home. Similarly, the wireless control system 12, using the GPS device 48, may automatically change the function or name of each button depending on the geographic location of the vehicle. For example, button B1 may be designated and trained to open the garage door at HOME upon an input by the user when the GPS device 48 determines the vehicle is within a specified distance of such location, or may be set to this location as a default. When the wireless control system 12 determines that the location has changed, using the GPS device 48, by virtue of the newly determined geographical location, the wireless control system 12 may automatically change button B1 to function to open a garage door at a new location, say VACATION HOME, or add a new button that provides this functionality.

Wireless control system 12 may also be programmed to allow customized use. For example, an operator could program the transceiver to partially open a garage door (e.g. "pet door" setting or "dim lighting" setting). Using customized programming, the operator can choose (customize) the setting using the interface, and control circuit 30 would then execute the customized even (e.g. opening a door partially, or setting lights to dim at a specific time).

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A wireless control system in a vehicle having an instrument panel or mirror, a center console and a vehicle position determination device, for wireless control of a remote electronic system, said wireless control system:

- a display located within at least one of the instrument panel, the mirror and the center console;
- a transmitter module configured to transmit a wireless control signal having control data which will control the remote electronic system;
- an interface module in communication with the vehicle position determination device and wherein said interface module receives current geographic position data; and
- a control module in communication with said display, said interface module, and said transmitter module, and wherein said control module receives geographic position data from said interface module and wherein said control module upon determining that the current geographic position data is within a specified range of a preprogrammed geographic location tag communicates a prompt to said display relating to the preprogrammed geographic location tag, wherein the prompt is displayed to prompt a user to provide a user input by selecting a function associated with the preprogrammed geographic location tag, and wherein said control module performs the selected function in response to receipt of the user input,
- wherein multiple functions are preprogrammed into said control module, each of the multiple functions having the preprogrammed geographic position, and wherein said control module upon determining that the current geographic position data is within the specified range of the preprogrammed geographic position communicates a plurality of prompts to said display where each prompt is associated with a different one of the multiple functions such that the user may select amongst the multiple functions.

2. A method of training and using a wireless control system located in a vehicle having an instrument panel, a center console and a vehicle position determination device, the wireless control system having a control module, an interface module and a transmitter module, said method comprising the steps of:

- programming the wireless control system with a specific function and wherein the function has a programmed geographic location tag obtained from the vehicle position determination device;
- providing a current vehicle geographic position from the vehicle position determination device to the control module via the interface module;

determining if the current vehicle geographic position is within a specified distance of the programmed geographic location tag;

providing an output from the control module to the display upon determining that the current vehicle geographic position is within a specified distance of the programmed geographic location tag during said step of determining if the current vehicle geographic position is within a specified distance of the programmed geographic location tag;

displaying the output from the control module on the display in order to prompt a user to provide a user input;

receiving the user input in response to said output from the control module to the display; and transmitting with the transmitter module the specific function related to the received user input upon receiving said user input, wherein the step of programming the wireless control system further comprises displaying an animation or video on the display that assists a user in training procedures for performing the programming step.

3. The method of claim 2 wherein said step of receiving a user input further includes a step of registering a contact to the display in the vicinity of the output displayed or a press of a button associated with the output from said step of displaying the output.

4. The method of claim 2 wherein said step of displaying the output from the control module on the display further includes a step of providing a soft key popup on the display.

5. The method of claim 4 wherein said step of providing a soft key popup on the display further includes a step of programming a unique name to be associated with the specific function.

6. The method of claim 5 wherein said step of providing a soft key popup on the display further includes steps of:

retrieving the unique name from said step of programming a unique name; and graphically outputting the unique name on said display to label the soft key popup with the unique name.

7. A method of training and using a wireless control system located in a vehicle having an instrument panel, a center console and a vehicle position determination device, the wireless control system having a control module, an interface module and a transmitter module, said method comprising the steps of:

programming the wireless control system with a specific function and wherein the function has a programmed geographic location tag obtained from the vehicle position determination device;

providing a current vehicle geographic position from the vehicle position determination device to the control module via the interface module;

determining if the current vehicle geographic position is within a specified distance of the programmed geographic location tag;

providing an output from the control module to the display upon determining that the current vehicle geographic position is within a specified distance of the programmed geographic location tag during said step of determining if the current vehicle geographic position is within a specified distance of the programmed geographic location tag;

displaying the output from the control module on the display, wherein said step of displaying the output from the control module on the display further includes the step of providing a soft key popup on the display, wherein said step of providing a soft key popup on the display further includes the step of programming a unique name to be associated with the specific function;

retrieving the unique name from said step of programming a unique name;

graphically outputting the unique name on said display to label the soft key popup with the unique name;

programming multiple specific functions, each having a programmed geographic location tag; and displaying each specific function when the current geographic position of the vehicle is in the desired geographical proximity to the programmed geographic location tag.

8. The method of claim 7 further including the steps of:

programming a unique name for each specific function; and displaying each unique name with each specific function displayed during said step of displaying each specific function when the current geographic position of the vehicle is in the desired geographical proximity to the programmed geographic location tag.

9. The method of claim 2 wherein said displaying the output from the control module on the display occurs automatically and without any interaction with the user.

10. The method of claim 2 wherein said vehicle position device includes both a GPS device and compass and wherein both of the programmed geographic tag and the current vehicle geographic position includes both the GPS location of the vehicle as well as a heading direction.

11. The method of claim 2 wherein said step of receiving an input includes the steps of:

receiving a modified control input; and transmitting the modified control input.

12. The method of claim 11 wherein said step of receiving a modified control input is the user inputting that they want the specific function to be automatically modified as previously programmed.

13. The method of claim 12 wherein said step of the user inputting that they want the specific function to be automatically modified includes the steps of:

programming the modified specific function; and transmitting the modified specific function upon selection of a modified input.

14. The method of claim 13 wherein said step of programming the modified specific function is a step of programming a garage door to open or close partially.

15. The method of claim 2 wherein said step of displaying an output to the display further includes the step of providing a voice prompt and preparing to receive a voice command.

16. The method of claim 5 wherein said step of programming a unique name also includes the step of programming a graphical representation of the specific function.

17. The method of claim 2 further including the steps of:

transmitting the specific function to a remote device;

receiving a status update from the remote device; and providing an output to the display representing the status update received from the remote device.

18. A wireless control system in a vehicle having an instrument panel or mirror, a center console and a vehicle position determination device, for wireless control of a remote electronic system, said wireless control system:

a display located within at least one of the instrument panel, the mirror and the center console;

a transmitter module configured to transmit a wireless control signal having control data which will control the remote electronic system;

an interface module in communication with the vehicle position determination device and wherein said interface module receives current geographic position data; and a control module in communication with said display, said interface module, and said transmitter module, and wherein said control module receives geographic position data from said interface module and wherein said control module upon determining that the current geographic position data is within a specified range of preprogrammed geographic location tag communicates a prompt to said display relating to the preprogrammed geographic location tag, wherein the prompt is displayed to prompt a user to provide a user input by selecting a function associated with the preprogrammed geographic location tag, and wherein said control module performs the selected function in response to receipt of the user input, wherein said display displays an animation or video that assists a user in training procedures for performing programming of the system.

* * * * *